United States Patent Office 3,070,491
Patented Dec. 25, 1962

3,070,491
NEMATOCIDE
Rudolf Heusch, Koln-Stammheim, and Bernhard Homeyer, Opladen, Germany, assignors to Farbenfabriken Bayer Aktiengesellschaft, Leverkusen, Germany, a corporation of Germany
No Drawing. Filed Jan. 9, 1961, Ser. No. 81,275
Claims priority, application Germany Jan. 9, 1960
2 Claims. (Cl. 167—22)

The present invention relates to and has as its objects soil disinfectants and more specifically methods of combating nematodes. The active ingredients useful therefore may be represented by the following general formula:

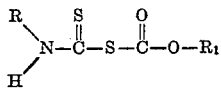

i.e. dithiocarbamic acid-formic acid ester compounds, wherein R and $R_1$ denote alkyl, aryl or aralkyl groups.

A number of compounds have already been proposed to combat nematodes in the soil. For example, mixtures of dichloropropene and dichloropropane (DD), sodium-N-methyl-dithiocarbamate or methyl-isothiocyanate are on the market for combating nematodes.

The compounds to be used according to this invention are distinguished as compared with the known agents by an especially high activity which becomes apparent by the very small quantities to be applied. The reduction of the quantities to be applied permits also a shortening of the clearance time i.e. the safety period between the last application of the active ingredient and the sowing of the crop.

Finally, the aforesaid compound class possesses in addition to its nematocidal activity a substantial fungicidal and insecticidal activity in the soil, and even a herbicidal action during the above mentioned safety period. On account of this wide activity, these compounds may be used quite generally as soil disinfectants. Some of the compounds of the present application are already known (cf. Org. Synth., 21 [1941], 81), the unknown compounds may be prepared exactly as said in the aforementioned publication.

The above-mentioned compounds may successfully be employed as nematocidal agents by soil injection, pouring into the plough furrows or onto the soil surface and subsequently working them into the soil. Dependent upon the type of soil, they are used as solvents or emulsions admixed with inert solid or liquid carriers or diluents, possibly together with suitable emulsifiers, especially of non-ionic type.

Examples

The following compounds in quantities indicated below were injected into the centre of 5 litre-pots highly infested with *Meloidogyne incognita*. The pots were allowed to stand at 25° C. for 1 week and, after 3 weeks, planted with tomato plants. The evaluation of the tomato roots with regard to nematode infestation was carried out after another 5 weeks. In the following table the quantity of the compounds used and the compounds used and the degrees of efficiency are mean values of 3 tests. For the control agents the LD 100-value is given from at least 10 tests determined according to the aforesaid test method.

The following examples are given for the purpose of illustrating the invention.

(1) $CH_3-NH-CS-S-CO-O-CH_3$

| | Percent killed |
|---|---|
| 100 mg./litre soil | 100 |
| 80 mg./litre soil | 100 |
| 60 mg./litre soil | 100 |
| 40 mg./litre soil | 100 |
| 20 mg./litre soil | 100 |
| 10 mg./litre soil | 50 |

(2) $CH_3-NH-CS-S-CO-O-C_2H_5$

| | Percent killed |
|---|---|
| 100 mg./litre soil | 100 |
| 80 mg./litre soil | 100 |
| 60 mg./litre soil | 100 |
| 40 mg./litre soil | 90 |
| 20 mg./litre soil | 50 |
| 10 mg./litre soil | 0 |

(3) $CH_3-NH-CS-S-CO-O-CH_2-CH_2-Cl$

| | Percent killed |
|---|---|
| 100 mg./litre soil | 100 |
| 80 mg./litre soil | 100 |
| 60 mg./litre soil | 100 |
| 40 mg./litre soil | 80 |
| 20 mg./litre soil | 50 |
| 10 mg./litre soil | 0 |

(4) Minimum quantity for a 100% kill of the same test in comparison with known nematocidal agents (control agents):

| | p.p.m. |
|---|---|
| Dichloropropane-dichloropropene | 66 |
| Na - N - methyl - dithiocarbamate | 37 |
| Methylisothiocyanate | 30 |
| $CH_3-NH-SC-S-CO-O-CH_3$ | 20 |

We claim:
1. A process for destroying nematodes in soil which comprises contacting said nematodes with an effective amount of a compound of the following formula

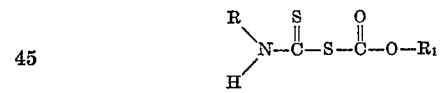

in which R and $R_1$ stand for lower alkyl radicals up to 4 carbon atoms.

2. A nematocidal composition containing an effective amount of a compound of the formula

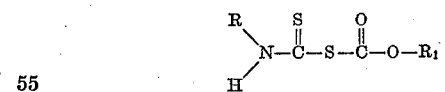

in which R and $R_1$ stand for lower alkyl radicals up to 4 carbon atoms; and an emulsifier.

References Cited in the file of this patent
UNITED STATES PATENTS
2,943,972 Kerk _____ July 5, 1960

OTHER REFERENCES
Organic Syntheses, vol. 21, 1941, page 81.